United States Patent
Sato

(10) Patent No.: US 12,190,544 B2
(45) Date of Patent: Jan. 7, 2025

(54) METHOD OF CALIBRATING CAMERA TO ROBOT, SYSTEM, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Akinobu Sato, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 13 days.

(21) Appl. No.: 18/338,389

(22) Filed: Jun. 21, 2023

(65) Prior Publication Data
US 2023/0419545 A1  Dec. 28, 2023

(30) Foreign Application Priority Data
Jun. 22, 2022 (JP) .................. 2022-100007

(51) Int. Cl.
*G06T 7/80* (2017.01)
(52) U.S. Cl.
CPC ...... *G06T 7/80* (2017.01); *G06T 2207/20024* (2013.01); *G06T 2207/20081* (2013.01)
(58) Field of Classification Search
CPC ............. G06T 7/80; G06T 2207/10016; G06T 2207/20024; G06T 2207/20076; G06T 2207/20081; G06T 2207/20084; G06T 2207/30164
USPC .................................................. 348/180, 187
See application file for complete search history.

(56) References Cited

U.S. PATENT DOCUMENTS

| 2023/0115521 A1* | 4/2023 | Kupcsik ................... B25J 13/08 700/259 |
| 2024/0144532 A1* | 5/2024 | Karito ..................... G06T 7/248 |

FOREIGN PATENT DOCUMENTS

JP  2017-124448 A  7/2017

* cited by examiner

*Primary Examiner* — Sherrie Hsia
(74) *Attorney, Agent, or Firm* — Harness, Dickey & Pierce, P.L.C.

(57) ABSTRACT

A method according to the present disclosure includes (a) estimating pixel coordinate values of a plurality of characteristic points set in advance in a robot arm from an image of the robot arm taken by a camera using a first machine learning model, (b) estimating first coordinate values of the plurality of characteristic points in a 3D camera coordinate system from the pixel coordinate values of the plurality of characteristic points using a second machine learning model, (c) calculating second coordinate values of the plurality of characteristic points in a 3D robot coordinate system using an encoder value of the robot arm, and (d) executing the steps (a) through (c) with respect to a plurality of postures of the robot arm to estimate calibration parameters including an external parameter of the camera using the first coordinate values and the second coordinate values of the plurality of characteristic points in the plurality of postures.

6 Claims, 7 Drawing Sheets

METHOD OF CALIBRATING CAMERA TO ROBOT, SYSTEM, AND NON-TRANSITORY COMPUTER-READABLE STORAGE MEDIUM STORING COMPUTER PROGRAM

The present application is based on, and claims priority from JP Application Serial Number 2022-100007, filed Jun. 22, 2022, the disclosure of which is hereby incorporated by reference herein in its entirety.

BACKGROUND

1. Technical Field

The present disclosure relates to a method of calibrating camera to robot, a system, and a non-transitory computer-readable storage medium storing a computer program.

2. Related Art

When using the camera in an operation by a robot, there are set calibration parameters of the camera by performing a calibration in advance. In the calibration parameters, there are included internal parameters representing a performance of the lens and a relationship between the lens and pixels, and an external parameter representing a relative position between the camera and an external device. It is common for the calibration of the camera to be performed using a dedicated calibration board on which a pattern such as dots or a chessboard is printed or processed. Such common calibration processing requires dedicated equipment, and an adjustment of the dedicated equipment requires an enormous amount of time. Further, it is necessary to perform the calibration every time a positional relationship between the camera and the robot changes, which becomes a factor of decreasing the usability of the robot.

In order to resolve such a decrease in usability, in JP-A-2017-124448, there is proposed a method of attaching an arm marker to a robot arm to associate a known position on the robot arm and the arm marker with each other.

However, in the related art described above, it is necessary to attach the marker to the robot arm, and therefore, there is a problem that the operation is cumbersome. Therefore, there is desired a technology capable of performing the calibration of the camera without attaching the marker to the robot arm.

SUMMARY

According to a first aspect of the present disclosure, there is provided a method of calibrating a camera to a robot. This method includes (a) estimating pixel coordinate values of a plurality of characteristic points set in advance in a robot arm from an image of the robot arm taken by the camera using a first machine learning model already learned, (b) estimating first coordinate values of the plurality of characteristic points in a 3D camera coordinate system from the pixel coordinate values of the plurality of characteristic points using a second machine learning model already learned, (c) calculating second coordinate values of the plurality of characteristic points in a 3D robot coordinate system using an encoder value of the robot arm, and (d) executing the steps (a) through (c) with respect to a plurality of postures of the robot arm to estimate calibration parameters including an external parameter of the camera using the first coordinate values and the second coordinate values of the plurality of characteristic points in the plurality of postures.

According to a second aspect of the present disclosure, there is provided a system configured to execute calibration processing of a camera to a robot. The system includes a camera configured to take an image of a robot arm of the robot, and a calibration processor configured to execute the calibration processing of the camera using the image taken by the camera. The calibration processor executes (a) processing of estimating pixel coordinate values of a plurality of characteristic points set in advance in the robot arm from the image of the robot arm taken by the camera using a first machine learning model already learned, (b) processing of estimating first coordinate values of the plurality of characteristic points in a 3D camera coordinate system from the pixel coordinate values of the plurality of characteristic points using a second machine learning model already learned, (c) processing of calculating second coordinate values of the plurality of characteristic points in a 3D robot coordinate system using an encoder value of the robot arm, and (d) processing of executing the processing (a) through (c) with respect to a plurality of postures of the robot arm to estimate calibration parameters including an external parameter of the camera using the first coordinate values and the second coordinate values of the plurality of characteristic points in the plurality of postures.

According to a third aspect of the present disclosure, there is provided a non-transitory computer-readable storage medium storing a computer program configured to make a processor perform calibration processing of a camera to a robot. The computer program is configured to make the processor execute (a) processing of estimating pixel coordinate values of a plurality of characteristic points set in advance in a robot arm from an image of the robot arm taken by the camera using a first machine learning model already learned, (b) processing of estimating first coordinate values of the plurality of characteristic points in a 3D camera coordinate system from the pixel coordinate values of the plurality of characteristic points using a second machine learning model already learned, (c) processing of calculating second coordinate values of the plurality of characteristic points in a 3D robot coordinate system using an encoder value of the robot arm, and (d) processing of executing the processing (a) through (c) with respect to a plurality of postures of the robot arm to estimate calibration parameters including an external parameter of the camera using the first coordinate values and the second coordinate values of the plurality of characteristic points in the plurality of postures.

DESCRIPTION OF EXEMPLARY EMBODIMENTS

A. First Embodiment

Figure 1:
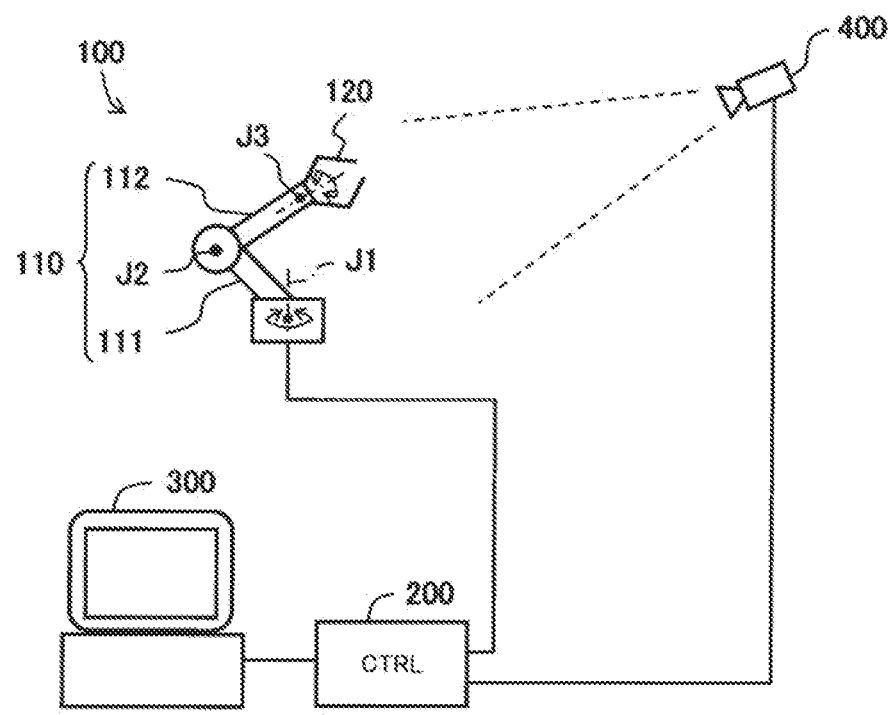
FIG. 1 is an explanatory diagram showing a configuration of a robotic system.

FIG. 1 is an explanatory diagram showing an example of a robotic system according to an embodiment. The robotic system is provided with a robot 100 as a camera-applied device, a robot controller 200 for controlling the robot 100, an information processing device 300, and a camera 400. The information processing device 300 is, for example, a personal computer. The information processing device 300 transmits a control command to the robot controller 200. The information processing device 300 can be called a "higher-level information processing device."

The robot 100 is provided with a robot arm 110 and an end effector 120. The robot arm 110 has a first link 111 and a second link 112. The end effector 120 can be realized as a gripper capable of gripping a work, or an adsorption pad.

The robot arm 110 and the end effector 120 are sequentially coupled with joints J1 through J3. It should be noted that as the robot 100, it is possible to use a robot having an arbitrary robot arm mechanism having a plurality of joints.

The camera 400 is used for taking an image of the work to be an operation target of the robot 100 to recognize a position and a posture of the work. Further, the camera 400 has a visual field with a size sufficient to take an image of the robot arm 110. As the camera 400, it is possible to use a 2D RGB camera, and further, it is possible to use an RGBD camera or a black-and-white camera. The RGBD camera is a camera having the RGB camera and a D camera (a depth camera).

Figure 2:
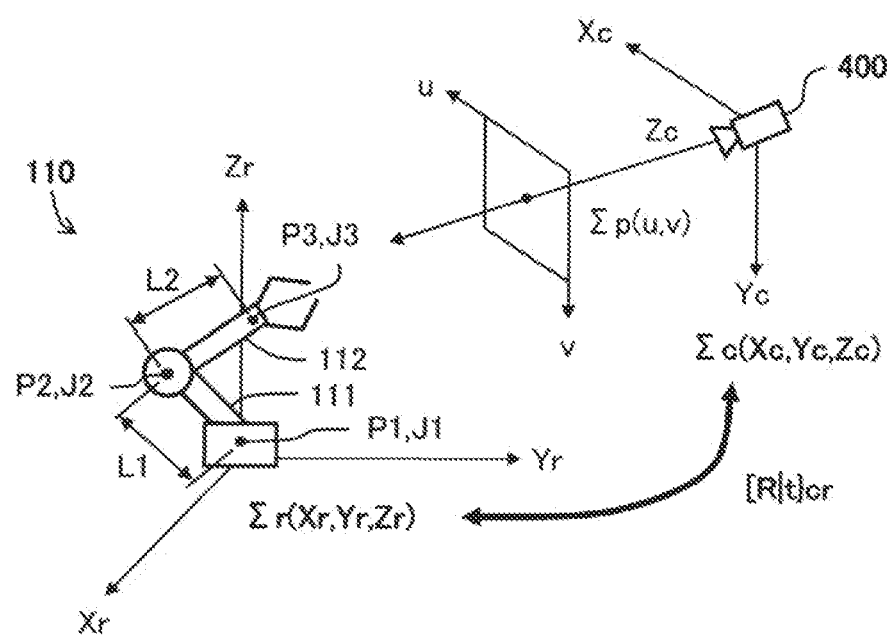
FIG. 2 is a conceptual diagram showing a relationship between a variety of coordinate systems.

FIG. 2 is a conceptual diagram showing a relationship between a variety of coordinate systems. The coordinate systems drawn in FIG. 2 are as follows.

(1) Robot Coordinate System Σr

The robot coordinate system Σr is a 3D orthogonal coordinate system having a coordinate origin at a position determined in advance in the robot 100.

(2) Camera Coordinate System Σc

The camera coordinate system Σc is a 3D orthogonal coordinate system having a coordinate origin at a position determined in advance in the camera 400.

(3) Pixel Coordinate System Σp

The pixel coordinate system Σp is a 2D orthogonal coordinate system of an image taken by the camera 400.

As shown in the following formula, a pixel coordinate value (u,v) in the pixel coordinate system Σp and a 3D coordinate value (Xc,Yc,Zc) in the camera coordinate system Σc can be converted to each other using internal parameters of the camera 400.

[Math. 1]

$$\begin{bmatrix} u \\ v \\ 1 \end{bmatrix} = \begin{bmatrix} k_x & 0 & O_x \\ 0 & k_y & O_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} Xc \\ Yc \\ Zc \\ 1 \end{bmatrix} \quad (1)$$

Here, $K_x$, $K_y$ each represent a distortion factor, $O_x$, $O_y$ each represent an optical center, and f represents a focal distance.

As shown in the following formula, the 3D coordinate value (Xc,Yc,Zc) in the camera coordinate system Σc and a 3D coordinate value (Xr,Yr,Zr) in the robot coordinate system Σr can be converted to each other using a coordinate conversion matrix $[R|t]_{cr}$ represented by external parameters of the camera 400.

[Math. 2]

$$\begin{bmatrix} Xr \\ Yr \\ Zr \\ 1 \end{bmatrix} = [R|t]_{cr} \begin{bmatrix} Xc \\ Yc \\ Zc \\ 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} Xc \\ Yc \\ Zc \\ 1 \end{bmatrix} \quad (2)$$

In FIG. 2, there is further drawn a plurality of characteristic points P1, P2, and P3 set in the robot arm 110. In the present embodiment, the characteristic points P1, P2, and P3 are respectively set at central positions of the three joints J1, J2, and J3 of the robot arm 110. The characteristic points P1, P2 can be considered to represent positions of both endpoints of the first link 111 having a length L1. Similarly, the characteristic points P2, P3 can be considered to represent positions of both end points of the second link 112 having a length L2. It should be noted that it is possible to set the characteristic points as much as an arbitrary number no smaller than two in the robot arm 110, and it is preferable to set three or more characteristic points. Further, the characteristic points can be set at arbitrary position in the robot arm 110 besides the joint positions in the robot arm 110. It should be noted that it is preferable to set the characteristic points at the joint positions in the robot arm 110 in the point that the positions of the characteristic points can easily be calculated from encoder values at a plurality of joints of the robot arm 110. Also when setting the characteristic points at other positions than the joints, by setting the relative positions between the positions of the characteristic points and the joint positions in advance, it is possible to calculate the positions of the characteristic points from the encoder values of the robot arm 110.

Figure 3:
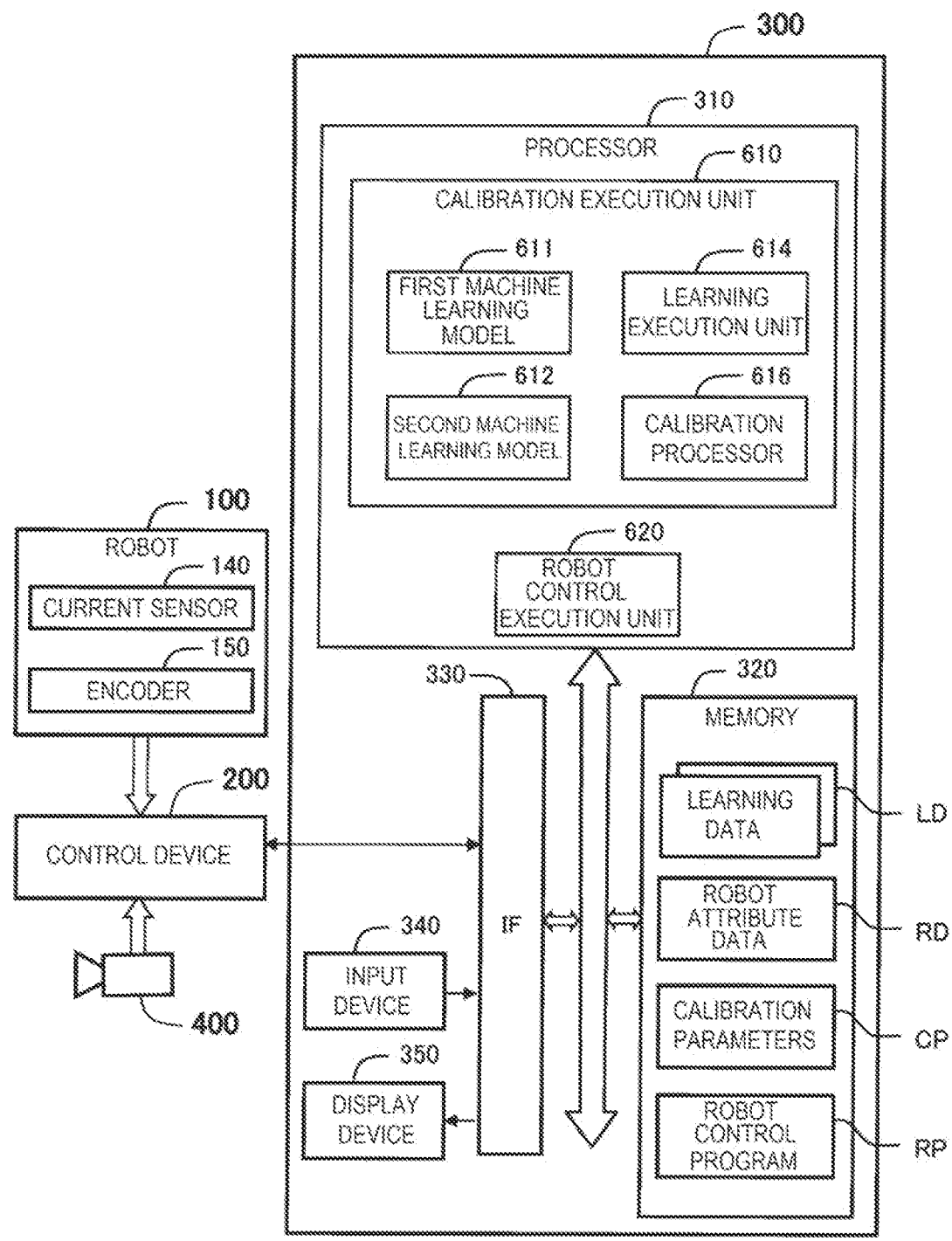
FIG. 3 is a functional block diagram of an information processing device.

FIG. 3 is a block diagram showing a function of the information processing device 300. The information processing device 300 has a processor 310, a memory 320, and an interface circuit 330. To the interface circuit 330, there are coupled an input device 340 and a display device 350, and further, there is also coupled the robot controller 200. The robot controller 200 is coupled to the camera 400, and is further coupled to a current sensor 140 for measuring a motor current of each of the joints of the robot 100, and an encoder 150 for measuring a displacement of each of the joints.

The processor 310 has functions as a calibration execution unit 610 and a robot control execution unit 620. The calibration execution unit 610 executes the calibration of the camera 400 to the robot 100 to thereby execute processing of determining the calibration parameters of the camera 400. The calibration execution unit 610 includes a first machine learning model 611, a second machine learning model 612, a learning execution unit 614, and a calibration processor 616. The robot control execution unit 620 executes processing of recognizing the work from an image of the work area taken by the camera 400, and then making the robot 100 perform the operation using the work thus recognized. The function of the calibration execution unit 610 is realized by the processor 310 executing a computer program stored in the memory 320. It should be noted that it is possible to realize apart or the whole of the function of the calibration execution unit 610 with a hardware circuit.

In the memory 320, there are stored learning data LD to be used for learning of the two machine learning models 611, 612, robot attribute data RD, calibration parameters CP, and a robot control program RP. The robot attribute data RD is data representing attributes such as a mechanical structure and a movable range of the robot. The calibration parameters CP include the internal parameters and the external parameter described above. The robot control program RP is constituted by a plurality of commands for making the robot 100 operate.

Figure 4:
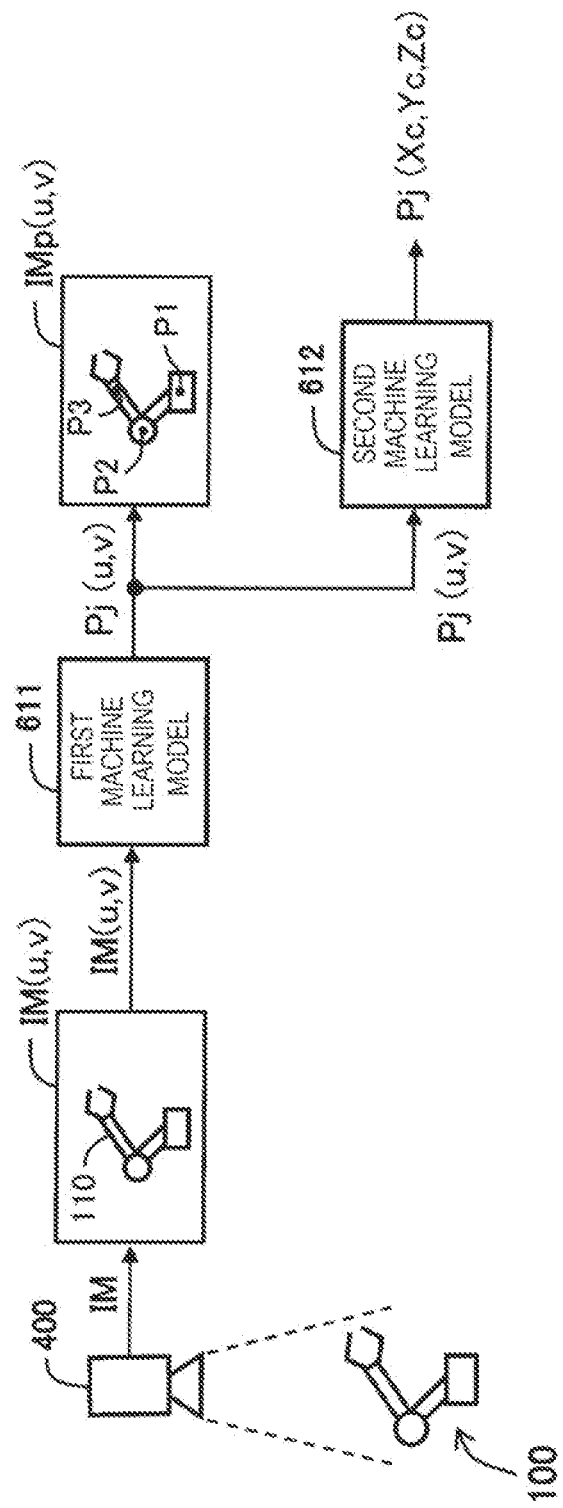
FIG. 4 is an explanatory diagram showing functions of a first machine learning model and a second machine learning model.

FIG. 4 is an explanatory diagram showing functions of the first machine learning model 611 and the second machine learning model 612. The first machine learning model 611 takes an image IM(u,v) of the robot arm 110 taken by the camera 400 as an input, and estimates the pixel coordinate values Pj(u,v) of the plurality of characteristic points Pj. The character j is an ordinal number for distinguishing the plurality of characteristic points P1 through P3 from each other. An image IMp(u,v) shown in FIG. 4 is a virtual image obtained by drawing the plurality of characteristic points Pj in the original image IM(u,v). The image IMp(u,v) can be generated by the calibration processor 616 when executing the calibration, and then displayed on the display device 350, but the image IMp(u,v) is not required to be generated.

The second machine learning model 612 takes the pixel coordinate values Pj(u,v) of the plurality of characteristic points Pj as the input, and estimates 3D coordinate values Pj(Xc,Yc,Zc) of the characteristic points Pj in the camera coordinate system Σc. The 3D coordinate values Pj(Xc,Yc,Zc) are used when the calibration processor 616 estimates the calibration parameters of the camera 400.

As the first machine learning model 611, it is possible to use a variety of types of neural network of inferring the structural characteristic points in the image, and any of the followings, for example, can be used.

(1a) DeeplabCUT (http://www.mackenziemathislab.org/deeplabcut)
(1b) DeepPose (https://arxiv.org/abs/1312.4659)

It is preferable for the learning data of the first machine learning model 611 to be teacher data including the image of the robot arm 110 taken by the camera 400, and the pixel coordinate values Pj(u,v) of the plurality of characteristic points Pj.

As the second machine learning model 612, it is possible to use a variety of types of neural network of inferring SfM (Structure from Motion) or NRSfM (Non-Rigid Structure from Motion), and any of the followings, for example, can be used.

(2a) C3DPO (https://arxiv.org/abs/1909.02533)
(2b) RepNet (https://sites.google.com/view/repnet)

It is preferable for the learning data of the second machine learning model 612 to be teacher data including the pixel coordinate values Pj(u,v) of the plurality of characteristic points Pj which can be obtained from the image of the robot arm 110, and the 3D coordinate values Pj(Xc,Yc,Zc) of the plurality of characteristic points Pj.

Figure 5:
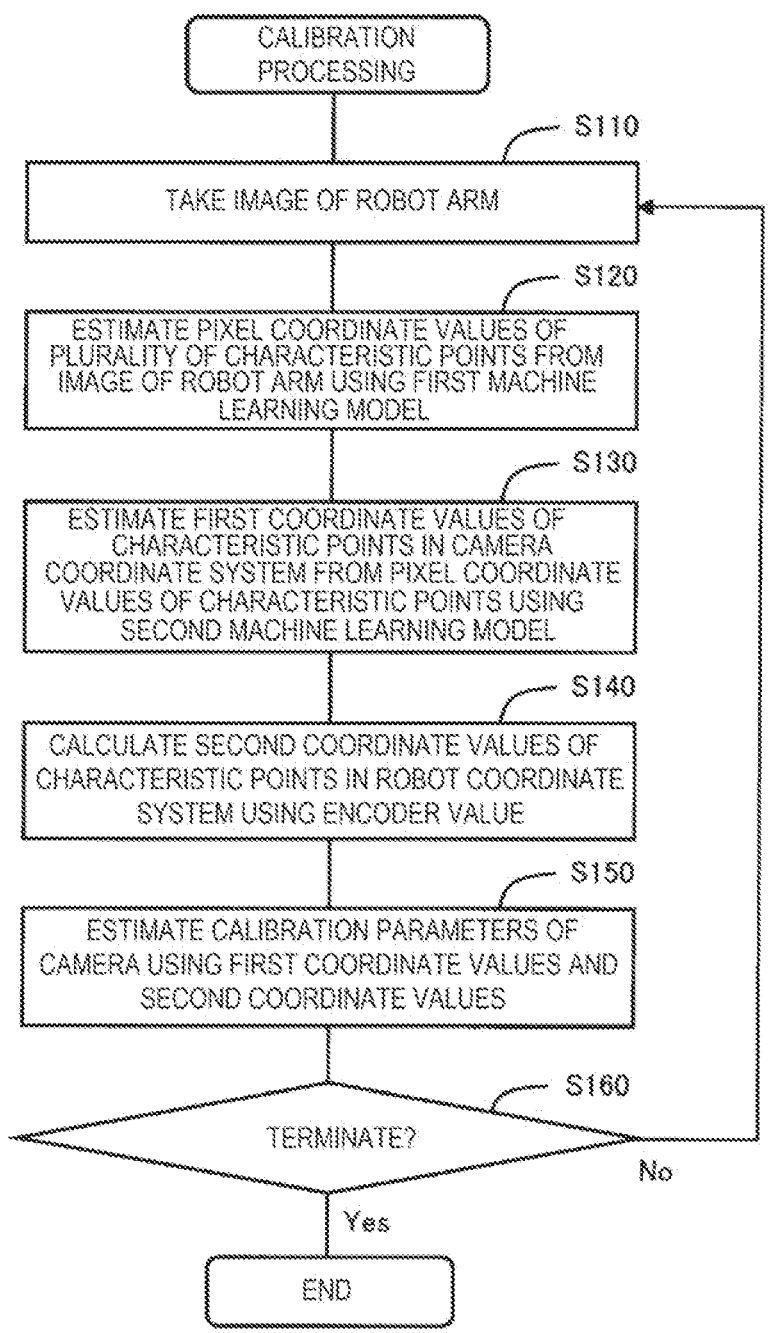
FIG. 5 is a flowchart showing a procedure of calibration processing in a first embodiment.

FIG. 5 is a flowchart showing a procedure of calibration processing in the first embodiment. Here, it is assumed that the two machine learning models 611, 612 have already been learned. Further, it is assumed that at the time point before the calibration processing, at least the external parameter of the calibration parameters of the camera 400 is unknown. The internal parameters of the camera 400 can be known or can also be unknown. In other words, the calibration processing shown in FIG. 5 is processing of estimating the calibration parameters including the external parameter of the camera 400.

In the step S110, the calibration processor 616 takes the image of the robot arm 110 using the camera 400 to generate the image IM. In the step S120, the calibration processor 616 estimates the pixel coordinate values Pj(u,v) of the plurality of characteristic point Pj from the image IM of the robot arm 110 using the first machine learning model 611. In the step S130, the calibration processor 616 estimates a first coordinate value Pj(Xc,Yc,Zc) of the characteristic point Pj in the camera coordinate system Σc from the pixel coordinate value Pj(u,v) of the characteristic point Pj using the second machine learning model 612. It should be noted that since the Z coordinate value Zc is necessary for calculating the coordinate value (Xc,Yc,Zc) in the camera coordinate system Σc from the pixel coordinate value (u,v) using the formula (1) described above also when the internal parameters of the camera 400 are known before the calibration processing, the second machine learning model 612 is used in the step S130 in order to obtain the Z coordinate value Zc.

In the step S140, the calibration processor 616 calculates the second coordinate value Pj(Xr,Yr,Zr) of the characteristic point Pj in the robot coordinate system Σr using an encoder value of the robot 100. The calculation processing corresponds to a calculation by the forward kinematics using the encoder values of the joints J1, J2, and the lengths L1, L2 of the links 111, 112.

In the step S150, the calibration processor 616 estimates the calibration parameters of the camera 400 using the first coordinate value Pj(Xc,Yc,Zc) and the second coordinate value Pj (Xr, Yr, Zr) of the characteristic point Pj. In the present embodiment, a Kalman filter is used for the estimation processing. By using the Kalman filter, even when the positional relationship between the camera 400 and the robot 100 changes, it is possible to sequentially perform the parameter estimation.

In general, the Kalman filter is processing which is constituted by two steps, namely time update and measurement update, and repeats these two steps to thereby minimize the estimation error. When estimating the calibration parameters of the camera 400, since there is no control input, and there is no time variation, there is no need to consider the time update. In other words, by defining a state vector, an observation matrix, and an observation vector, and then performing the observation update, it is possible to estimate the calibration parameters of the camera 400. For example, when estimating the external parameter alone, the state vector x, the observation matrix H, and the observation vector Z are as follows.

[Math. 3]

$$x = [r_{11}\ r_{12}\ r_{12}\ r_{21}\ r_{22}\ r_{23}\ r_{31}\ r_{32}\ r_{33}\ t_x\ t_y\ t_z]^T \quad (3a)$$

$$H = \begin{bmatrix} X_r & Y_r & Z_r & 0 & 0 & 0 & 0 & 0 & 0 & 1 & 0 & 0 \\ 0 & 0 & 0 & X_r & Y_r & Z_r & 0 & 0 & 0 & 0 & 1 & 0 \\ 0 & 0 & 0 & 0 & 0 & 0 & X_r & Y_r & Z_r & 0 & 0 & 1 \end{bmatrix} \quad (3b)$$

$$Z = [X_c\ Y_c\ Z_c]^T \quad (3c)$$

The state vector x is an external parameter, the observation matrix H is the 3D coordinate values of the characteristic points Pj in the robot coordinate system Zr, and the observation vector Z is the 3D coordinate values of the characteristic points Pj in the camera coordinate system Σc.

When the external parameter constituting the state vector x is correctly estimated, the observation vector Z becomes what is obtained by multiplying the observation matrix H by the state vector x.

Although the method of estimating the external parameter alone is described here, it is also possible to perform the estimation including the internal parameter in a similar manner. When estimating the internal parameter together with the external parameter, the internal parameter is added to the state vector x, and the observation matrix is also changed accordingly. It should be noted that the Kalman filter is not a limitation, and it is possible to estimate the calibration parameters using other methods such as an iterative least squares technique or a particle filter.

In the step S160, the calibration processor 616 determines whether or not the estimation processing of the calibration parameters has been completed. For example, defining the processing of the steps S110 through S150 as single iteration, it is possible to determine that the estimation processing of the calibration parameters is completed when the iteration is executed a predetermined number of times. Alternatively, it is possible to determine that the estimation processing of the calibration parameters is completed when a difference in estimate value or a difference in error covariance between the previous iteration and the present iteration becomes no higher than a threshold value.

When the estimation processing of the calibration parameters is not completed, the process returns to the step S110, and the processing in the steps S110 through S150 described above is executed once again. It should be noted that the posture of the robot arm 110 is set so that the robot arm 110 takes a posture different between the plurality of times of iteration in the step S110. In other words, every time the image IM of the robot arm 110 is taken by the camera 400 with respect to a new posture of the robot arm 110, the steps S120 through S150 are executed, and the observation update using the Kalman filter is performed to thereby estimate the calibration parameters. As a result, since the correspondence relationship between the first coordinate values Pj(Xc,Yc,Zc) in the camera coordinate system Zc and the second coordinate values Pj(Xr,Yr,Zr) in the robot coordinate system Zr can be obtained with respect to the plurality of postures different from each other of the robot arm 110, it becomes possible to correctly estimate the calibration parameters of the camera 400.

When the estimation processing of the calibration parameters is terminated, the calibration parameters CP thus estimated is stored in the memory 320 to complete the processing shown in FIG. 5. In the case of a stationary robot, it is rare for the positional relationship between the camera 400 and the robot 100 to dramatically change. Therefore, by storing the estimation information including the error covariance and so on of the Kalman filter together with the calibration parameters CP thus estimated, and then reusing the estimation information as initial values in the next calibration processing, it is possible to advance the convergence of the estimate values.

It is possible to arrange that the calibration processing shown in FIG. 5 described above is performed in parallel to a practical operation using the robot 100. In this way, since it is possible to execute the calibration processing of the camera 400 while performing the operation on the work using the robot 100, a special processing time for the calibration processing is unnecessary. It should be noted that it is preferable to take the image of the robot arm 110 in the state in which the robot arm 110 is at rest in the step S110 also when executing the calibration processing in parallel to the practical operation.

As described above, in the first embodiment, since the first coordinate values Pj(Xc,Yc,Zc) in the camera coordinate system Σc are estimated from the image IM taken by the camera 400, and further, the second coordinate values Pj(Xr,Yr,Zr) in the robot coordinate system. Zr are calculated from the encoder values of the robot arm 110 with respect to the plurality of characteristic points Pj set in advance in the robot arm 110, and then the calibration parameters CP of the camera 400 are estimated from these 3D coordinate values, it is possible to estimate the calibration parameters CP of the camera 400 without using the calibration board. Further, it is possible to perform the calibration of the camera 400 without attaching the marker to the robot arm 110.

B. Second Embodiment

Figure 6:
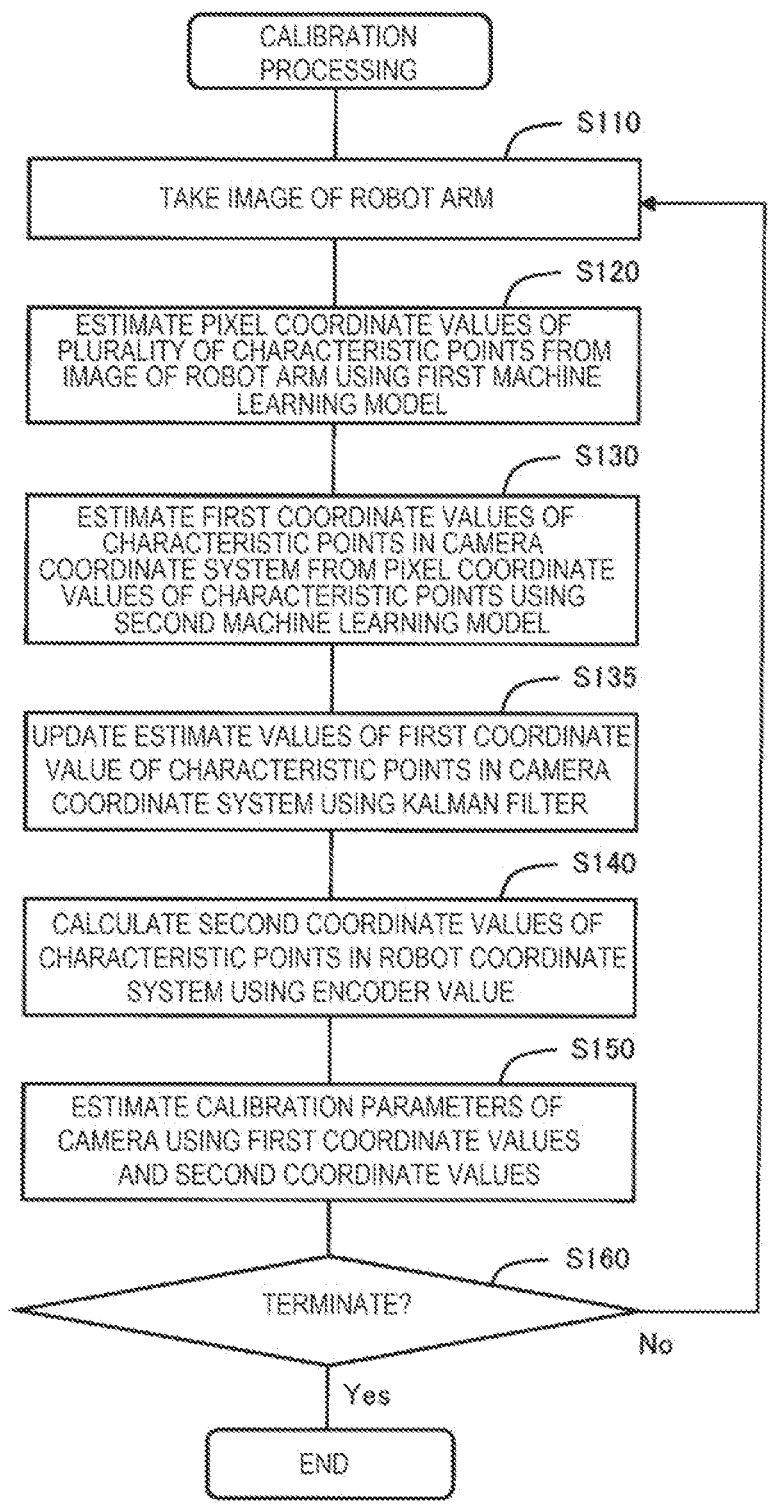
FIG. 6 is a flowchart showing a procedure of calibration processing in a second embodiment.

FIG. 6 is a flowchart showing a procedure of calibration processing in a second embodiment. One and only difference from the first embodiment is that the step S135 is added between the step S130 and the step S140, and other steps are the same as in the calibration processing in the first embodiment shown in FIG. 5. Further, the device configuration is also the same as that in the first embodiment.

In the step S135, the calibration processor 616 inputs the estimate values of the first coordinate values Pj(Xc,Yc,Zc) of the characteristic points Pj obtained in the step S130 to the Kalman filter, and adds a restriction to the observation to thereby stochastically update the estimate values of the first coordinate values of the characteristic points Pj. As the restriction, it is possible to use a mechanical or mechanistic restriction related to the robot arm 110. Specifically, in the step S135, by performing the observation update using the Kalman filter including the mechanical restriction related to the robot arm 110, the estimate values of the first coordinate values Pj(Xc,Yc,Zc) of the characteristic points Pj are updated.

Figure 7:
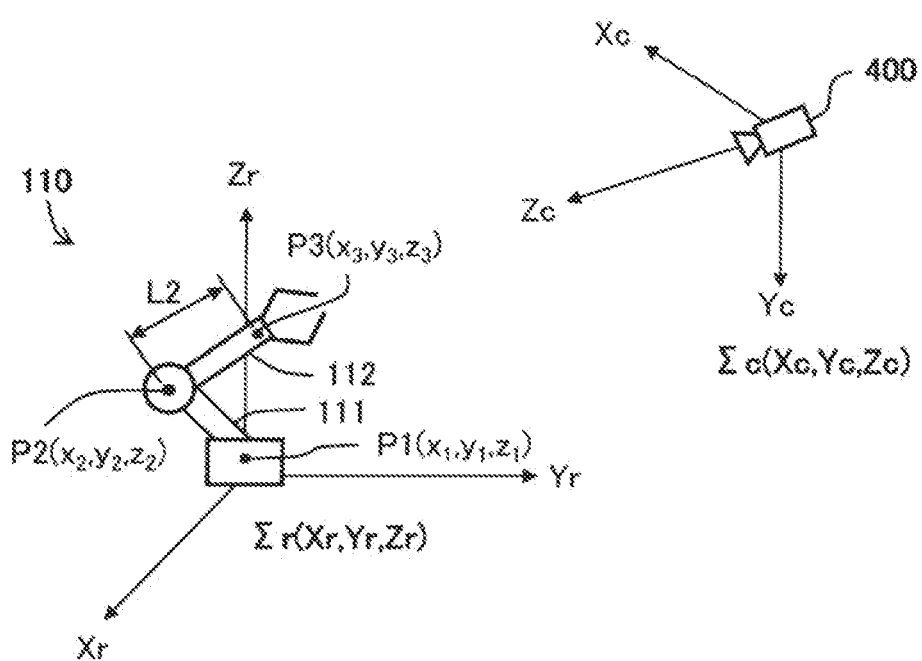
FIG. 7 is an explanatory diagram showing an example of a mechanical restriction used in the step S135.

FIG. 7 is an explanatory diagram showing an example of the restriction used in the step S135. In this example, the length L2 of the second link 112 is used as the restriction. In this case, the state vector x, the observation matrix H, and the observation vector Z in the Kalman filter to be used in the step S135 are as follows.

[Math. 4]

$$x = [\hat{x}_1 \; \hat{y}_1 \; \hat{z}_1 \; \hat{x}_2 \; \hat{y}_2 \; \hat{z}_2 \; \hat{x}_3 \; \hat{y}_3 \; \hat{z}_3] \quad (4a)$$

$$H = \left[ \frac{\partial r}{\partial x_1} \; \frac{\partial r}{\partial y_1} \; \frac{\partial r}{\partial z_1} \; \frac{\partial r}{\partial x_2} \; \frac{\partial r}{\partial y_2} \; \frac{\partial r}{\partial z_2} \; \frac{\partial r}{\partial x_3} \; \frac{\partial r}{\partial y_3} \; \frac{\partial r}{\partial z_3} \right] \quad (4b)$$

-continued $$= \begin{bmatrix} 0 & 0 & 0 & \frac{-(x_3 - x_2)}{r} & \frac{-(y_3 - y_2)}{r} & \frac{-(z_3 - x_2)}{r} & \frac{(x_3 - x_2)}{r} & \frac{(y_3 - y_2)}{r} & \frac{(z_3 - z_2)}{r} \end{bmatrix}$$

$$r = \sqrt{(x_3 - x_2)^2 + (y_3 - y_2)^2 + (z_3 - z_2)^2} \quad (4c)$$

$$Z = r = L2 \quad (4d)$$

Here, elements of the state vector x are the correct estimate value of the first coordinate value of the characteristic points Pj in the camera coordinate system Σc, and elements of the observation matrix H are the estimate values of the first coordinate values of the characteristic points Pj in the camera coordinate system Σc obtained in the step S130.

By performing the observation update using the Kalman filter including such a mechanical restriction, it is possible to update the estimate values of the first coordinate values of the characteristic points Pj so as to fulfill the restriction provided by the formula (4) described above.

As another example of the mechanical restriction, it is possible to use a restriction that the plurality of characteristic points Pj exists on the same plane. For example, when the three characteristic points P1 through P3 exist on the same plane, when assuming a 3D vector represented by the 3D coordinate values of each of the characteristic points Pj, the volume of a cube defined by the three 3D vectors becomes zero. This is synonymous with that a determinant of a matrix obtained by arranging the three 3D column vectors becomes zero. The state vector x, the observation matrix H, and the observation vector Z in the Kalman filter in this case are as follows.

[Math. 5]

$$x = [\hat{x}_1 \ \hat{y}_1 \ \hat{z}_1 \ \hat{x}_2 \ \hat{y}_2 \ \hat{z}_2 \ \hat{x}_3 \ \hat{y}_3 \ \hat{z}_3] \quad (5a)$$

$$H = \begin{bmatrix} \frac{\partial D}{\partial x_1} & \frac{\partial D}{\partial y_1} & \frac{\partial D}{\partial z_1} & \frac{\partial D}{\partial x_2} & \frac{\partial D}{\partial y_2} & \frac{\partial D}{\partial z_2} & \frac{\partial D}{\partial x_3} & \frac{\partial D}{\partial y_3} & \frac{\partial D}{\partial z_3} \end{bmatrix} \quad (5b)$$

$$= \begin{matrix} [y_2 z_3 - y_3 z_2 & x_3 z_2 - x_2 z_3 & x_2 y_3 - x_3 y_2 \\ y_3 z_1 - y_1 z_3 & x_1 z_3 - x_3 z_1 & x_3 y_1 - x_1 y_3 \\ y_1 z_2 - y_2 z_1 & x_2 z_1 - x_1 z_2 & x_1 y_2 - x_2 y_1] \end{matrix}$$

$$D = \begin{vmatrix} x_1 & x_2 & x_3 \\ y_1 & y_2 & y_3 \\ z_1 & z_2 & z_3 \end{vmatrix} \quad (5c)$$

$$Z = D = 0 \quad (5d)$$

As the mechanical restriction, it is possible to apply other restrictions such as lengths of two or more links, or a restriction that three or more characteristic points Pj are arranged in the same straight line in the state in which the two or more links linearly stretch, besides the examples described above. Further, by applying a plurality of restrictions at the same time, it is possible to update the first coordinate values of the plurality of characteristic points Pj into more accurate values.

By using such a mechanical restriction as described hereinabove, it becomes possible to update the first coordinate values of the characteristic points Pj conforming with the shape of the robot arm 110, and since it is possible to suppress a variation and a jump of the 3D positions of the characteristic points Pj, it is possible to realize the stable estimation of the calibration parameters.

The second embodiment also has substantially the same advantages as those of the first embodiment. Further, in the second embodiment, since the estimate values of the first coordinate values of the plurality of characteristic points Pj in the camera coordinate system Σc are updated using the Kalman filter including the mechanical restriction, it is possible to increase an estimate accuracy of the first coordinate values.

Other Aspects:

The present disclosure is not limited to the embodiments described above, but can be implemented in a variety of aspects within the scope or the spirit of the present disclosure. For example, the present disclosure can also be implemented in the following aspects. The technical features in the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a method of calibrating a camera to a robot. This method includes (a) estimating pixel coordinate values of a plurality of characteristic points set in advance in a robot arm from an image of the robot arm taken by the camera using a first machine learning model already learned, (b) estimating first coordinate values of the plurality of characteristic points in a 3D camera coordinate system from the pixel coordinate values of the plurality of characteristic points using a second machine learning model already learned, (c) calculating second coordinate values of the plurality of characteristic points in a 3D robot coordinate system using an encoder value of the robot arm, and (d) executing the steps (a) through (c) with respect to a plurality of postures of the robot arm to estimate calibration parameters including an external parameter of the camera using the first coordinate values and the second coordinate values of the plurality of characteristic points in the plurality of postures.

According to this method, since the first coordinate values in the 3D camera coordinate system are estimated from the image taken by the camera with respect to the plurality of characteristic points set in advance in the robot arm, and further the second coordinate values of the 3D robot coordinate system are calculated from the encoder value of the robot arm to estimate the calibration parameters of the camera from these 3D coordinate values, it is possible to estimate the calibration parameters of the camera without using the calibration board. Further, it is possible to perform the calibration of the camera without attaching the marker to the robot arm.

(2) In the method described above, it is possible to assume that the plurality of characteristic points are respectively set at central positions of a plurality of joints of the robot arm.

According to this method, it is possible to easily estimate the first coordinate values of the plurality of characteristic points using the first machine learning model, and further, it is possible to easily calculate the second coordinate values in the robot coordinate system.

(3) In the method described above, it is possible to assume that the step (d) includes estimating the calibration parameters by performing observation update using a Kalman filter every time an image of the robot arm is taken by the camera with respect to a new posture of the robot arm.

According to this method, since the calibration parameters are estimated using the Kalman filter, it is possible to increase the accuracy of the calibration parameters every time the new posture related to the robot arm is imaged by the camera to perform the estimation.

(4) In the method described above, it is possible to assume that the step (b) includes updating estimate values of the first coordinate values of the plurality of characteristic points by performing observation update using the Kalman filter including a mechanical restriction related to the robot arm with respect to the first coordinate values obtained by the second machine learning model.

According to this method, since the estimate values of the first coordinate values of the plurality of characteristic points in the 3D camera coordinate system are updated using the Kalman filter including the mechanical restriction, it is possible to increase the estimate accuracy of the first coordinate values.

(5) According to a second aspect of the present disclosure, there is provided a system configured to execute calibration processing of a camera to a robot. The system includes a camera configured to take an image of a robot arm of the robot, and a calibration processor configured to execute the calibration processing of the camera using the image taken by the camera. The calibration processor executes (a) processing of estimating pixel coordinate values of a plurality of characteristic points set in advance in the robot arm from the image of the robot arm taken by the camera using a first machine learning model already learned, (b) processing of estimating first coordinate values of the plurality of characteristic points in a 3D camera coordinate system from the pixel coordinate values of the plurality of characteristic points using a second machine learning model already learned, (c) processing of calculating second coordinate values of the plurality of characteristic points in a 3D robot coordinate system using an encoder value of the robot arm, and (d) processing of executing the processing (a) through (c) with respect to a plurality of postures of the robot arm to estimate calibration parameters including an external parameter of the camera using the first coordinate values and the second coordinate values of the plurality of characteristic points in the plurality of postures.

(6) According to a third aspect of the present disclosure, there is provided a non-transitory computer-readable storage medium storing a computer program configured to make a processor perform calibration processing of a camera to a robot. The computer program is configured to make the processor execute (a) processing of estimating pixel coordinate values of a plurality of characteristic points set in advance in a robot arm from an image of the robot arm taken by the camera using a first machine learning model already learned, (b) processing of estimating first coordinate values of the plurality of characteristic points in a 3D camera coordinate system from the pixel coordinate values of the plurality of characteristic points using a second machine learning model already learned, (c) processing of calculating second coordinate values of the plurality of characteristic points in a 3D robot coordinate system using an encoder value of the robot arm, and (d) processing of executing the processing (a) through (c) with respect to a plurality of postures of the robot arm to estimate calibration parameters including an external parameter of the camera using the first coordinate values and the second coordinate values of the plurality of characteristic points in the plurality of postures.

The present disclosure can be implemented in a variety of aspects other than the above. For example, it is possible to implement the present disclosure in an aspect such as a robotic system provided with a robot and a robot information processing device, a computer program for realizing the function of the robot information processing device, or a non-transitory storage medium on which the computer program is recorded.

What is claimed is:

1. A method of calibrating a camera to a robot, the method comprising:
    (a) estimating pixel coordinate values of a plurality of characteristic points set in advance in a robot arm from an image of the robot arm taken by the camera using a first machine learning model already learned;
    (b) estimating first coordinate values of the plurality of characteristic points in a 3D camera coordinate system from the pixel coordinate values of the plurality of characteristic points using a second machine learning model already learned;
    (c) calculating second coordinate values of the plurality of characteristic points in a 3D robot coordinate system using an encoder value of the robot arm; and
    (d) executing the steps (a) through (c) with respect to a plurality of postures of the robot arm to estimate calibration parameters including an external parameter of the camera using the first coordinate values and the second coordinate values of the plurality of characteristic points in the plurality of postures.

2. The method according to claim 1, wherein the plurality of characteristic points are respectively set at central positions of a plurality of joints of the robot arm.

3. The method according to claim 1, wherein the step (d) includes estimating the calibration parameters by performing observation update using a Kalman filter every time an image of the robot arm is taken by the camera with respect to a new posture of the robot arm.

4. The method according to claim 1, wherein the step (b) includes updating estimate values of the first coordinate values of the plurality of characteristic points by performing observation update using the Kalman filter including a mechanical restriction related to the robot arm with respect to the first coordinate values obtained by the second machine learning model.

5. A system configured to execute calibration processing of a camera to a robot, the system comprising:
    a camera configured to take an image of a robot arm of the robot; and
    a calibration processor configured to execute the calibration processing of the camera using the image taken by the camera, wherein
    the calibration processor is configured to execute
        (a) processing of estimating pixel coordinate values of a plurality of characteristic points set in advance in the robot arm from the image of the robot arm taken by the camera using a first machine learning model already learned,
        (b) processing of estimating first coordinate values of the plurality of characteristic points in a 3D camera coordinate system from the pixel coordinate values of the plurality of characteristic points using a second machine learning model already learned, (c) processing of calculating second coordinate values of the plurality of characteristic points in a 3D robot coordinate system using an encoder value of the robot arm, and (d) processing of executing the processing (a) through (c) with respect to a plurality of postures of the robot arm to estimate calibration parameters including an external parameter of the camera using the first coordinate values and the second coordinate values of the plurality of characteristic points in the plurality of postures.

6. A non-transitory computer-readable storage medium storing a computer program configured to make a processor execute calibration processing of a camera to a robot, the calibration processing comprising:

(a) processing of estimating pixel coordinate values of a plurality of characteristic points set in advance in a robot arm from an image of the robot arm taken by the camera using a first machine learning model already learned;

(b) processing of estimating first coordinate values of the plurality of characteristic points in a 3D camera coordinate system from the pixel coordinate values of the plurality of characteristic points using a second machine learning model already learned;

(c) processing of calculating second coordinate values of the plurality of characteristic points in a 3D robot coordinate system using an encoder value of the robot arm; and (d) processing of executing the processing (a) through (c) with respect to a plurality of postures of the robot arm to estimate calibration parameters including an external parameter of the camera using the first coordinate values and the second coordinate values of the plurality of characteristic points in the plurality of postures.

* * * * *